United States Patent [19]

Videc

[11] 4,348,706
[45] Sep. 7, 1982

[54] EDGE GUIDE FOR A MAGNETIC TAPE

[75] Inventor: Bernard P. Videc, Eindhoven, Netherlands

[73] Assignee: U.S. Philips Corporation, New York, N.Y.

[21] Appl. No.: 165,890

[22] Filed: Jul. 3, 1980

[30] Foreign Application Priority Data

Jul. 6, 1979 [NL] Netherlands ............... 7905278

[51] Int. Cl.$^3$ ............................................. G11B 15/60
[52] U.S. Cl. .................. 360/130.24; 360/84; 226/198
[58] Field of Search ............ 360/130.24, 130.21, 360/71, 84, 107, 102; 226/198, 199

[56] References Cited

U.S. PATENT DOCUMENTS

| | | | |
|---|---|---|---|
| 3,939,494 | 2/1976 | Okuda | 360/130.24 X |
| 3,955,215 | 5/1976 | Hosai | 360/130.24 |
| 3,995,318 | 11/1976 | Serizawa | 360/130.24 |
| 4,012,792 | 3/1977 | Bloom | 360/130.24 |
| 4,031,558 | 6/1977 | Kusaka | 360/130.24 |
| 4,163,266 | 7/1979 | Tamamura et al. | 360/84 |
| 4,274,118 | 6/1981 | Mangold | 360/84 |

FOREIGN PATENT DOCUMENTS 19825 10/1980 European Pat. Off. ....... 360/130.24

*Primary Examiner*—John H. Wolff
*Attorney, Agent, or Firm*—David R. Treacy

[57] ABSTRACT

A tape recorder having a tape guide member with a guide edge against which the tape is loaded or biased by pressure members. To press the tape against the supporting edge with a transverse force approximately constant per unit of length, pressure members are arranged beyond the ends of the tape-supporting edge, and the tape supporting edge has a curvature convex toward the tape, with a peak substantially midway between tape-support entry and exit points having a smaller radius of curvature than that of the remainder of the tape-supporting edge.

8 Claims, 21 Drawing Figures

EDGE GUIDE FOR A MAGNETIC TAPE

BACKGROUND OF THE INVENTION

The invention relates generally to apparatus for recording and reading signals in tracks on an elongated tape such as a magnetic tape in the form of a ribbon, having substantially parallel longitudinal edges and having a certain resistance to bending in the plane of the tape and in particular to such an apparatus comprising: at least one magnetic head for recording and reading tracks on the magnetic tape; a tape guide member for guiding the magnetic tape in a path past the magnetic head (s), which tape guide member is provided with a tape-supporting edge for supporting one of the two longitudinal edges of the magnetic tape along the path between a tape-support entry point and a tape-support exit-point; means for sustaining a tape tension of a specific magnitude in the longitudinal direction of the magnetic tape; and pressure members for cooperating with, and exerting transverse pressure forces of a specific magnitude on, the magnetic tape in order to press the magnetic tape against the tape-supporting edge with a transverse force which is as constant as possible per unit of length over the entire part of the tape-supporting edge between the tape-support entry point and the tape-support exit point.

Such apparatus, generally referred to as magnetic tape recorders or briefly tape recorders, are known, for example, from U.S. Pat. No. 3,995,318 that relates to a helical-scan video recorder, i.e., a tape recorder for recording and reading video signals in obliquely directed adjacent tracks on a magnetic tape. The magnetic heads are rotatable about an axis of rotation in a circular path for recording and reading the oblique tracks on the magnetic tape. The magnetic heads are mounted on a magnetic head support in the form of a so-called "head disc", which is rotatable about the axis of rotation. The tape guide means comprises a tape guide drum system which is coaxial with the axis of rotation of the magnetic heads, which system has a circumferential surface around which the magnetic tape is guided by the tape-supporting edge in a substantially helical path along the circular path of the magnetic heads. The tape guide drum system comprises a stationary lower drum, on which the tape-supporting edge is located; the head disc; and a stationary upper drum. The head disc rotates with a small clearance between the upper drum and the lower drum. In the upper drum a plurality of axially directed slots are formed in which elongate wire springs are movable, which springs project over a small distance from the circumferential surface of the upper drum and bear on the longitudinal edge of the magnetic tape which is situated opposite the tape-supporting edge.

The purpose of the tape-supporting edge is to guide the magnetic tape in an accurately defined path along the tape guide means; i.e., in the aforementioned example, around the tape guide drum system. Deviations of the magnetic tape from this path result in tracks which have been recorded on the magnetic tape not being in the optimum position for reading by means of a magnetic read head. Especially when wide-band signals are recorded, such as video signals, it is very important that during read-out the recorded tracks move past the magnetic read head with great precision. If the magnetic tape, in its path past the magnetic heads, in addition to a constant deviation, also exhibits a deviation which varies in time, other effects occur which adversely affect the quality of the signal reproduced. Such fluctuations in the position of the magnetic tape on the tape guide means may, for example, occur owing to fluctuations in the shape of the longitudinal edges of the tape. Ribbon-like magnetic tapes are manufactured by cutting a wide strip of plastic foil, coated with a layer of a magnetic material, into ribbons by means of rotary cutters. During this cutting operation certain deviations in the shape of the longitudinal edges of the magnetic tapes are inevitable. During manufacture and during cutting of the ribbons the plastic foil is moreover subject to stresses which after cutting manifest themselves in the form of local changes in shape. It is therefore of importance that in the tape recorder the magnetic tape is pressed as firmly as possible against the tape-supporting edge in the transverse direction. It is obvious that there are limitations in this respect, because the magnetic tape is very thin and is therefore only capable of withstanding a small local load on its longitudinal edges. In the case of an excessive local load the tape is folded over locally. Therefore, it is important that locally the magnetic tape is not subjected to a load higher than a specific maximum permissible transverse force. The magnetic tape is pressed against the tape-supporting edge in an optimum manner when at any point of the tape-supporting edge the transverse force exerted by the magnetic tape equals the maximum permissible transverse force. Thus, it is important that over the entire portion of the tape-supporting edge between the tape-support entry point and the tape-support exit point a transverse force is exerted which is as constant as possible per unit of length.

Although in the foregoing the field to which the invention relates has been discussed with reference to a helical-scan video recorder, the invention is not limited to this field. Indeed, similar problems may occur in other equipment for recording and reading signals on a ribbon-like magnetic tape, for example if the magnetic tape passes along a straight tape guide member and the magnetic heads are not mounted for rotation but are stationary, such as in an audio magnetic tape recorder.

DESCRIPTION OF THE PREFERRED EMBODIMENTS

A disadvantage of the tape recorder known from the previously mentioned U.S. Pat. No. 3,995,318 stems from the fact that it should be possible to mount pressure means above the tape-supporting edge. Such a possibility is not present in those helical-scan video recorders in which the upper drum is not stationary but rotatable and the magnetic heads are connected to the rotary upper drum, so that the upper drum not only functions as the rotary section of the tape guide drum system but also as a rotary magnetic-head support. Such video recorders are frequently used and for an embodiment reference is, for example, made to U.S. Pat. No. 3,614,338. However, in other tape recorders it may also be a disadvantage if pressure means have to be provided opposite the tape-supporting edge. Moreover, in order to ensure a most uniform transverse force between the magnetic tape and the tape-supporting edge many pressure elements would be necessary, which means that a great number of parts would be required.

SUMMARY OF THE INVENTION

It is the object of the invention to provide an apparatus of the type mentioned above, in which no pressure means are required above the tape-supporting edge to ensure that the transverse force per unit of length between the tape-supporting edge and the magnetic tape is as constant as possible.

The invention is characterized in that the tape-supporting edge has a curvature which is convex toward the magnetic tape, with a peak substantially midway between the tape-support entry point and the tape support exit point; that the convex curvature of the tape-supporting edge, relative to an arc of a circle described by the tape-support entry point, the tape-support exit point and the peak of the curve, has a slightly smaller radius at the location of the peak and a slightly larger radius substantially halfway between the tape-support entry point and the peak and substantially halfway between the peak and the tape-support exit point respectively; and that the pressure members are disposed near the tape-support entry point and the tape-support exit point of the tape-supporting edge at locations beyond these points with respect to the path of the tape between these points in order to subject the magnetic tape along the tape-supporting edge to a curvature in the plane of the magnetic tape in conformity with the convex curvature of the tape-supporting edge and thus press the magnetic tape against the tape-supporting edge with the desired transverse force, which force is as constant as possible per unit of length.

Theoretical Consideration

In order to illustrate the theoretical background of the invention as well as the effect of the steps proposed by the invention reference is made to the drawing. As the magnetic tape in its path past the magnetic heads is guided by the tape guide means, a part of a magnetic tape which is loaded in its plane may be regarded as a beam which is loaded in its plane, so that applied-mechanics theory developed for straight beams can be followed. FIG. 1 schematically represents a beam 1 to which a distributed load 2 is applied. The beam 1 is shown in elevation, with an XOY system of axes which defines a plane in which the elevation of the beam 1 is situated. If from the beam 1 a portion is cut having a width dx, see FIG. 2, a number of internal forces and moments will generally act on the left-hand and right-hand side faces of this portion. For the analytical determination of these internal quantities, which when the beam is loaded by forces and moments in the XOY plane are transmitted by a beam cross-section, it is necessary to adapt a drawing convention. By means of arrows FIG. 2 indicates, in accordance with the current convention, how positive internal transverse forces D, positive internal moments M, as well as positive internal tensile stresses S are directed. Furthermore, FIG. 2 shows the influence of the external distributed load, i.e. the force qdx, if q represents the distributed external load per unit of length.

The equilibrium equation for the vertical forces acting on the portion of the beam 1 shown in FIG. 2, ignoring the mirror influence of the tensile stress S, is:

$$(D + dD) - D - qdx = o \quad (I)$$

-continued
$$q = \frac{dD}{dx}.$$

If the point designated G in FIG. 2, is chosen as the moment origin, the moment equilibrium equation will be:

$$(M+dM)-M-Ddx-qdx\cdot\tfrac{1}{2}dx=o,$$

which yields:

$$dM-Ddx-\tfrac{1}{2}q(dx)^2=o.$$

As the last term, which is infinitely small of the second order, is negligible relative to the first two terms, which are infinitely small of the first order, it follows that:

$$D = \frac{dM}{dx}. \quad (II)$$

Furthermore, in accordance with a known relationship from the theory of deformation of straight beams in their planes:

$$M = \frac{B}{R} \quad (III)$$

In the above relationships:
q = the distributed external load (N/m)
D = internal transverse force (N)
x = running coordinate (m)
M = internal moment (Nm)
B = resistance to bending (Nm²)
R = radius of curvature (m).

FIG. 3 schematically shows a part of a tape-supporting edge 3 and a part of a magnetic tape 4. The tape-supporting edge 3 extends between a tape-support entry point B1 and a tape-support exit point E1 and has a length L1. At locations beyond the ends of the tape-supporting edge 3 external transverse pressure forces P1 are exerted on the magnetic tape 4. Furthermore, a tensile stress S1 acts in the magnetic tape in the longitudinal direction. As a result of the fact that the transverse forces P1 act at some distance from the points B1 and E1 of the tape supporting edge, a bending moment is exerted on the portion of the magnetic tape between the tape-support points B1 and E1, in addition to a transverse force. FIG. 3 shows, in a greatly exaggerated manner, that the magnetic tape will assume a curved shape such that it will only rest on the supporting edge 3 at the tape-support entry point B1 and the tape-support exit point E1. At the location of these points reaction forces are exerted which are designated $P_{B1}$ and $P_{E1}$ and whose magnitude is equal to the external transverse forces P1.

As is apparent from FIG. 4 it is possible to bring the magnetic tape 4 into contact with the straight tape-supporting edge 3 over the entire length L1 between the tape-support entry point B1 and the tape-support exit point E1 by exerting external moments $M_{b1}$ on the magnetic tape, in addition to the transverse pressure forces P1. In the part of the magnetic tape between the points B1 and E1 the curvature of the magnetic tape is zero, so that in accordance with relation III the internal moment M in that length of the magnetic tape should also be zero. Referring to relations II and I, this also means that the internal transverse force D in this portion of the magnetic tape as well as the distributed external load q should be zero. The reaction forces exerted on the magnetic tape 4 by the tape-supporting edge 3 are therefore concentrated at B1 and E1, as before in FIG. 3.

From the foregoing theoretical consideration it will be evident that it is not possible to have a magnetic tape, which is pressed in position by transverse forces applied at locations beyond the ends of the tape-supporting edge, exert a force on the tape-supporting edge in the part between the tape-support entry point and the tape-support exit point. The use of a straight tape-supporting edge therefore has two major disadvantages. A first disadvantage is that the reaction forces are concentrated at the tape-support entry point and the tape-support exit point of the tape-supporting edge. In order to avoid excessive local loading of the magnetic tape the externally exerted transverse pressure forces should therefore have a corresponding, limited, value. A second, more important, disadvantage is that undesired moments and undesired forces which tend to lift the magnetic tape off the tape-supporting edge in the part between the tape-support entry point and the tape support exit point experience no counteracting forces in this part and consequently cause a displacement of the magnetic tape. As stated previously such displacements are undesired, for they complicate correct scanning of the tracks on the magnetic tape.

The situation of FIG. 3 and FIG. 4, in which a straight tape-supporting edge situated in a plane is shown, could occur in a magnetic audio tape apparatus or in a magnetic video tape apparatus with the stationary heads. Referring to FIGS. 5, 6 and 7 it will be illustrated that in principle this situation may also occur in a magnetic tape apparatus with rotary heads, in which the magnetic tape passes around a cylindrical tape guide means.

A cylinder 5 has an axis 6. On the circumferential surface of the cylinder 5 a helical tape-supporting edge 7 is formed for a magnetic tape 8. The magnetic tape is supported by the tape-supporting edge 7 between a tape support entry point B2 and a tape support exit point E2. The tape-supporting edge extends helically around part of the cylinder 5, specifically around half the cylinder. In practice the pitch of the helix is substantially smaller than is shown; it is exaggerated in the drawing for the sake of clarity. From a point A on the circumference of the cylinder, values are indicated for the angle in degrees of arc covered from point A around the circumference of the cylinder in FIGS. 5 and 6. The tape-supporting edge extends over an angle of 180°, namely from point B2 at 90° to point E2 at 270°. The difference in height between the points B2 and E2 is equal to half the pitch of the helix, which half pitch is designated ½s in FIG. 5. If the circumferential surface of the cylinder 5 is cut open along a line passing through point A and extending parallel to the axis 6 of the cylinder and is developed onto a plane, the elevation of FIG. 7 is obtained. A rectangle is obtained and the points B2 and E2 are joined by a straight line and have a difference in height of ½s. It will be evident that for studying the forces and moments acting on the magnetic tape as well as the deformations of the magnetic tape, the situation shown in FIG. 7 is fully similar to the situation of FIGS. 3 and 4.

FIG. 8 relates to a case in which a tape-supporting edge 9 supports a magnetic tape 10 between a tape-support entry point B3 and a tape-support exit point E3, and the tape-supporting edge is not straight but has a convex curvature with a constant radius R3 (which in the drawing is exaggerated small). This means (see relation III) that the internal moment in the magnetic tape 10 between the points B3 and E3 is also a constant. In accordance with relation II the internal transverse force is zero at a constant internal moment. In accordance with relation I this means that the distributed external load should then also be zero. The reaction forces resulting from the external transverse forces P3, as in the case of FIG. 3, are concentrated at the two points B3 and E3. In fact FIG. 3 is identical to the case of FIG. 8, except that in FIG. 8 the curvature of the tape-supporting edge is adapted to the curvature of the magnetic tape, which curvature should be a constant curvature between the tape-support entry point and the tape-support exit point, as follows from relation III. As a result of this analysis one may conclude that if the reaction forces resulting from the external transverse forces exerted on the magnetic tape at locations beyond the ends of the tape-supporting edge are not to be concentrated at specific points, the tape-supporting edge should have a convex curvature which is not constant.

FIG. 9 schematically represents a tape-supporting edge 11 in accordance with the inventive principle, having a non-constant convex curvature. Between a tape-support entry point B4 and a tape-support exit point E4 a slightly smaller radius of curvature has been provided at the location of a peak T4 of the curve, while between the tape-support entry point B4 and the peak T4 and between the peak T4 and the tape-support exit point E4 the edge has a slightly larger radius of curvature. The radius of curvature at the location of the peak T4 is the radius R41 and the radius of curvature substantially at the location of the point B4 is the radius R42. A number of small arrows Q indicate that now a distributed load occurs between B4 and E4, which load, for the previously stated reasons, should preferably be as uniform as possible. For calculating the correct curvature use is made of the theory discussed above for calculating the deformation in its plane of a straight beam with a uniformly distributed load. In such a case, as is known, the equation of the elastic line is a fourth-degree function of a coordinate which runs along the beam. Relative to an arc of circle the curve of the fourth-degree function has a smaller radius near the peak and a greater radius on both sides thereof. Minor corrections to the calculated curvature in view of the prevailing frictional forces etc. can be determined by experiment.

A preferred embodiment of the invention is characterized in that each of the pressure members is movable in a known manner and engages a longitudinal edge of the magnetic tape at a location where the magnetic tape is guided around a curved tape guide element or member having a radius of curvature which is small in proportion to the transverse dimension (width) of the magnetic tape, so as to inhibit folding-over of the magnetic tape as a result of the transverse pressure force. The transverse forces exerted on the magnetic tape should preferably be as constant as possible, even when the longitudinal edges of the magnetic tape are not perfectly straight everywhere. This means that resilient pressure members are advantageous; preferably the resilient force during movements of the pressure members, as a result of tolerances in the shape of the longitudinal edges of the magnetic tape, should vary to a minimal extent. Furthermore, this embodiment is of importance because transverse forces on an edge of such a thin flexible medium as a magnetic tape should preferably be exerted at a location where the magnetic tape is curved perpendicular to its plane to a comparatively strong extent. The curvature reduces the tendency of the magnetic tape to fold over under the influence of the transverse pressure exerted by the pressure members.

A further embodiment of the invention is of significance for equipment which is adapted to record and to reproduce wide-band signals in obliquely directly adjacent tracks on a magnetic tape, the magnetic head(s) being movable in a circular path about an axis of rotation for recording and reading the oblique tracks on the magnetic tape, the magnetic head(s) being arranged on a magnetic head support which is rotatable about the said axis of rotation, and the tape guide member comprising a tape guide drum system which is coaxial with the axis of rotation of the magnetic head(s), which system has a circumferential surface around which the magnetic tape is guided by the tape-supporting edge in a substantially helical path along the circular path of the magnetic head(s). This embodiment is characterized in that the circumferential surface is a conical surface, the cone apex being located relative to the magnetic tape beyond the far side of the longitudinal edge which co-operates with the tape-supporting edge, in order to ensure that the tape-supporting edge as closely as possible approximates an edge with a constant pitch.

BRIEF DESCRIPTION OF THE DRAWING

The invention will be described in more detail with reference to the drawings, which schematically represent an embodiment and in which.

DESCRIPTION OF THE PREFERRED EMBODIMENTS

Figure 10:
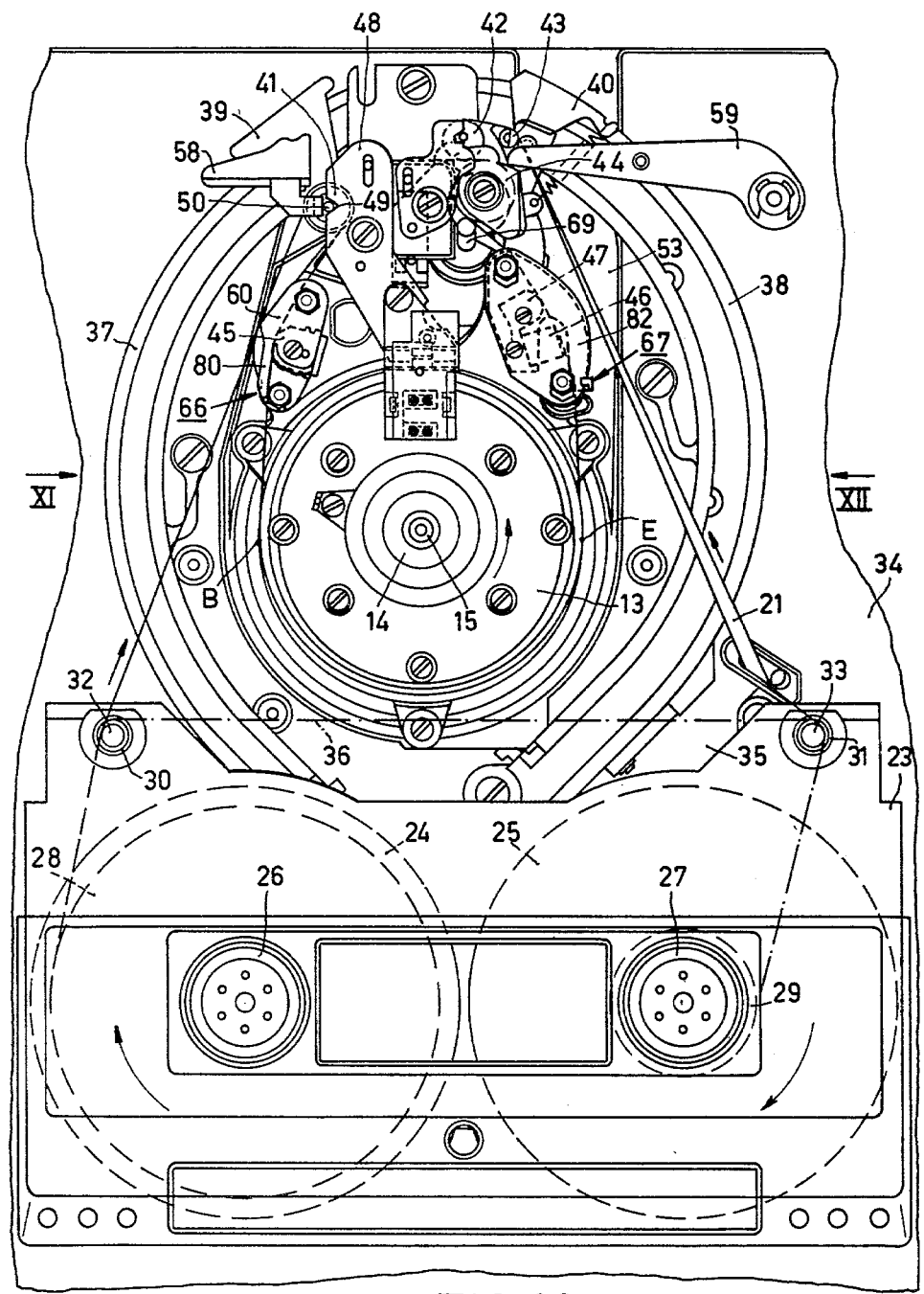
FIG. 10 is a plan view of the mechanism of a helical-scan video recorder which embodies the invention, a magnetic tape from a magnetic-tape cassette being looped around a drum unit with two rotary magnetic heads.
Figure 11:
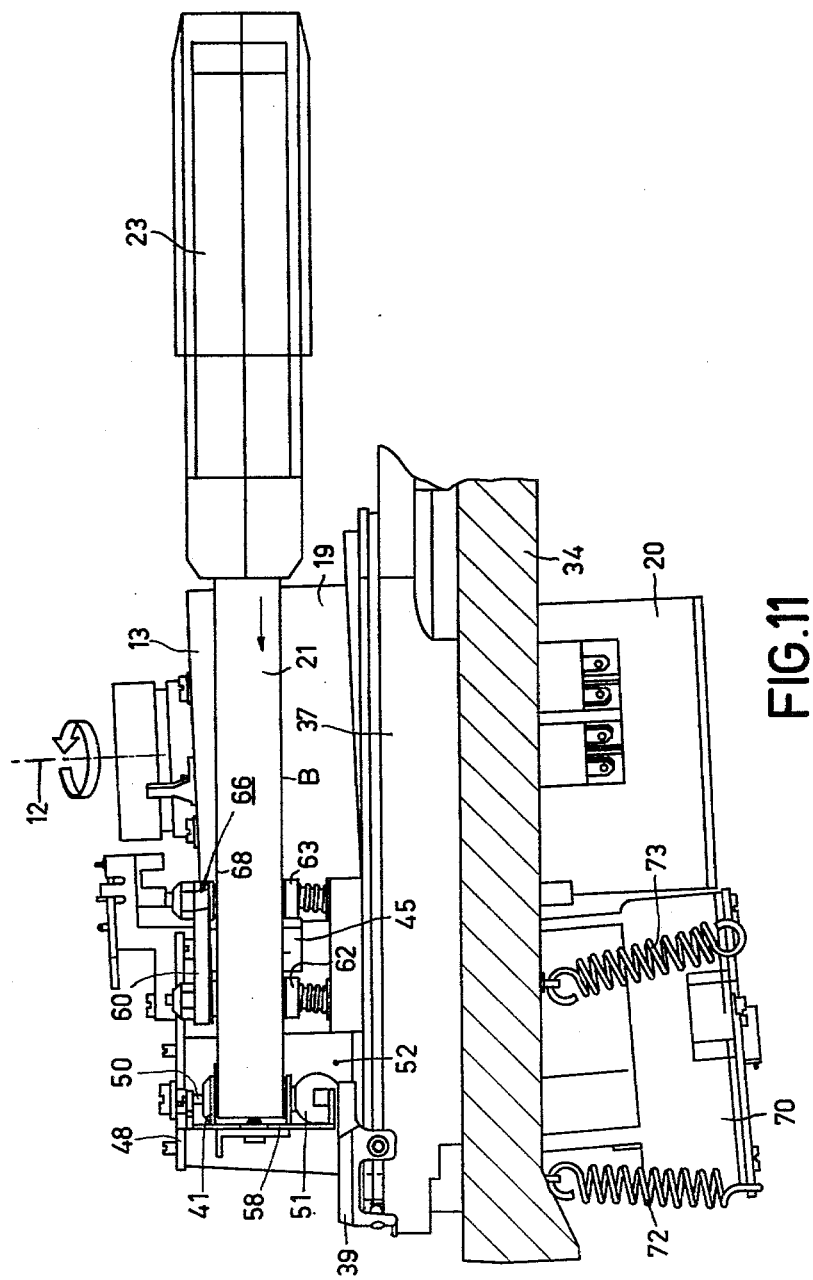
FIG. 11 is a side view of the mechanism of FIG. 10 looking in the direction of the arrow XI.
Figure 12:
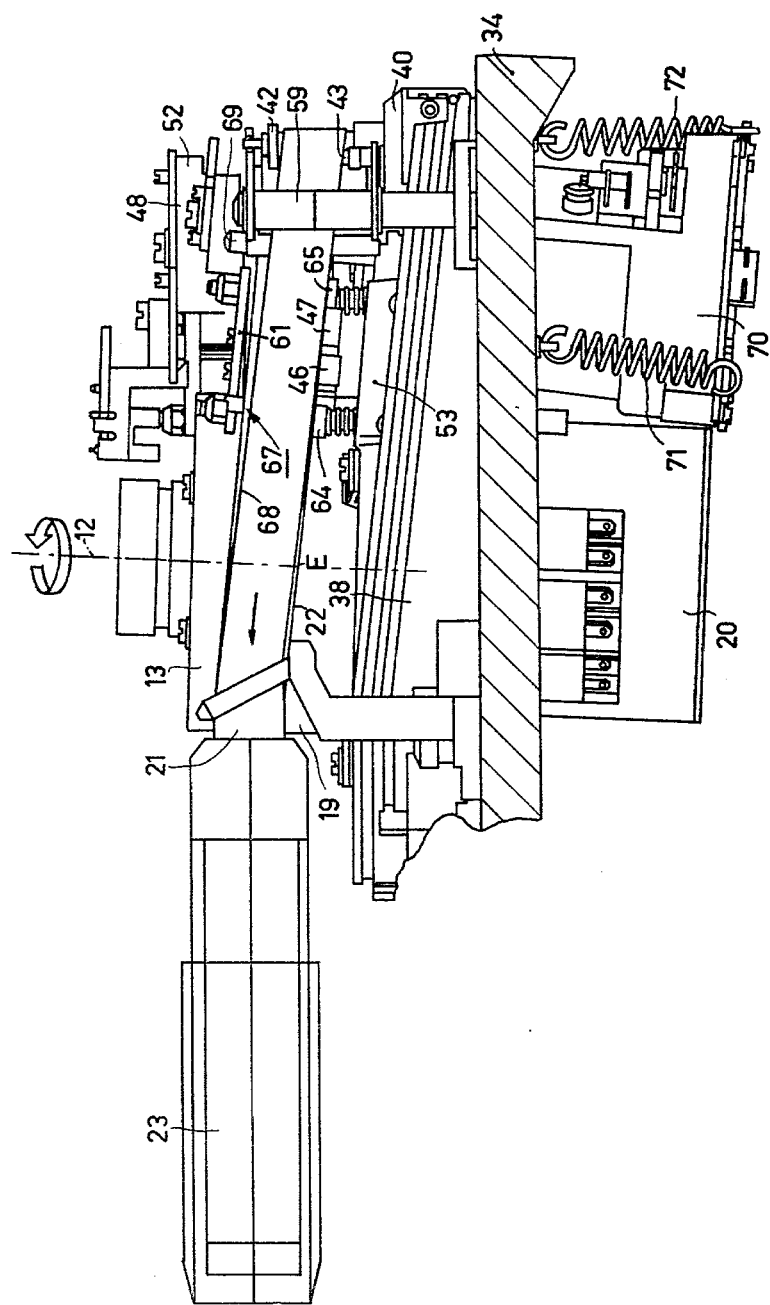
FIG. 12 is another side view of the mechanism of FIG. 10 but looking in the direction of the arrow XII.

For the sake of clarity FIGS. 10, 11 and 12 do not show those parts which are not considered of importance for a full understanding of the invention. These figures relate to a helical-scan video recorder of the type in which rotary magnetic heads read or write only half the width of the magnetic tape. The principle of such a helical-scan video recorder is known from British Patent No. 1,124,759) (herewith incorporated by reference).

Figure 13:
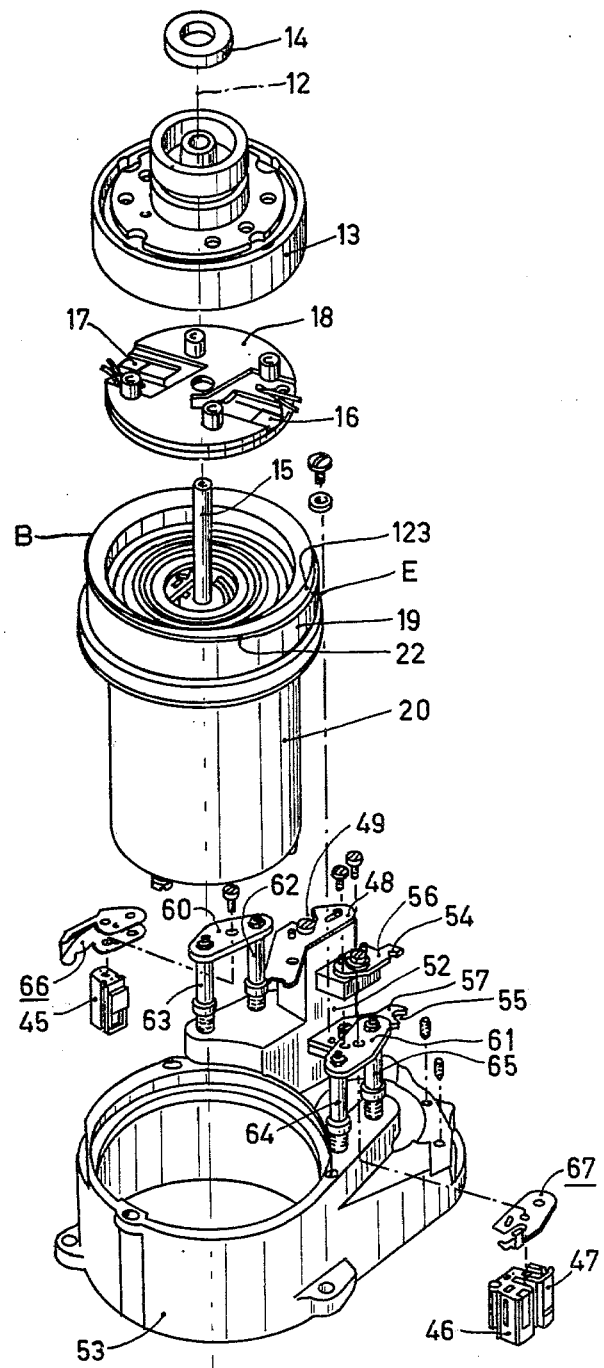
FIG. 13 is an exploded respective view of a part of the mechanism of FIGS. 10–12.

The helical-scan video recorder of FIGS. 10 to 12 comprises two magnetic video heads, which are movable in a circular path about an axis of rotation 12. The magnetic heads are accommodated on a magnetic-head support in the form of a head drum 13 which rotates about an axis of rotation 12. Said drum is secured to a spindle 15 by means of a retaining ring 14. Such a method of fixation has been described previously in previous patent application No. 144,730, filed Apr. 28, 1980 and assigned to the assignee of the instant application (herewith incorporated by reference). The magnetic heads are diametrically arranged on the head drum 13 and project from the periphery of the head drum over a small distance. Such head drums provided with two video heads for recording and reading wide-band signals in oblique adjacent tracks on a magnetic tape are well-known and are for example employed in various types of helical-scan video recorders for home entertainment use. The magnetic heads are of small dimensions and are not shown in FIGS. 10 to 12. In the exploded view of FIG. 13 the two video heads are designated by the reference numerals 16 and 17. They are located on a disc 18 which is connected to the head drum 13 and which rotates together with the drum. The video heads 16, 17 project through the head drum 13 adjacent a narrow gap which is formed between the head drum 13 and a stationary drum 19 which forms part of a motor housing 20. This motor housing accommodates a drive motor for driving the head drum via the spindle 15. The head drum 13 as well as the stationary drum 19 together in known manner constitute a tape guide drum system, which is coaxial with the axis of rotation 12 and serves as a tape guide means having a circumferential surface around which the magnetic tape 21 is guided in a substantially helical path along the circular path of the magnetic heads. For guiding the magnetic tape 21 around the circumferential surface of this tape guide drum system a tape-supporting edge 22 is provided on the stationary drum 19. By means of a special machining operation this edge is formed directly on the circumferential surface of the stationary drum 19. The circumferential surface around which the magnetic tape 21 is guided in a substantially helical path by means of the tape-supporting edge 22 thus comprises the rotary circumferential surface of the rotary head drum 13 as well as the stationary circumferential surface 123 of the stationary drum 19, situated above the tape-supporting edge 22. This circumferential surface 123 is situated on a slightly smaller radius than the remaining part of the stationary drum 19, viz. on a radius which is smaller by the width of the tape-supporting edge 22.

FIGS. 10 to 12 show a magnetic tape cassette 23 with the omission of some components which would conceal the helical-scan video recorder mechanism shown. A more extensive description of this magnetic-tape cassette can be found in U.S. Pat. No. 4,235,395 (herewith incorporated by reference). The magnetic-tape cassette is of the reversible type. Although the rotary video heads write or read only half the width of the magnetic tape, the entire width of the magnetic tape can be used by reversing the cassette so that the video heads can cooperate with the other half of the magnetic tape. The magnetic-tape cassette accommodates, adjacent each other, two reels 24 and 25 with winding hubs 26 and 27, respectively. Between these two reels the magnetic tape 21 can be unwound from a roll 28 on the hub 26 and wound onto a roll 29 on the hub 27 and vice versa. In the cassette the magnetic tape 21 passes round two tape guide members 30 and 31, which are aligned in the operating position on pins 32 and 33 respectively, which are mounted on a chassis plate 34. As regards the positioning of the cassette 23 on the apparatus, as well as the guidance of the magnetic tape 21, reference is made to U.S. Pat. No. 4,234,140 (herewith incorporated by reference). The two winding hubs 26 and 27 are each driven separately by electric motors, not shown. These two electric motors are connected, in any known manner, to an electronic control circuit, which adjusts the speed of the motor which drives the reel 26 to such a value, and imparts such a torque to the motor which drives the hub 27, that in the magnetic tape 21 a specific tape-tensioning force of a specific magnitude, which acts in the longitudinal direction of the magnetic tape, is produced and sustained.

For cooperation of the magnetic tape with the magnetic heads the magnetic tape is withdrawn from the cassette 23 over a small part of its length and is wrapped in a loop around the drum system comprising the rotary head drum 13 and the stationary drum 19, by a so-called "threading mechanism". In FIGS. 10 to 12 said threading mechanism is in an operating condition in which the magnetic tape has been wrapped around the drum system. At its front the magnetic tape cassette 23 is formed with a recess 35 so as to render the magnetic tape accessible to the threading mechanism. The position of the magnetic tape in the unthreaded condition is represented by the dash-dot line 36 in FIG. 10. When the cassette has been removed from the apparatus the recess 35 at the front of the cassette is closed by a spring-loaded slide which is movable over the magnetic tape cassette, while the front side of the magnetic tape is protected by a pivotable flap which is hinged to the cassette. In the drawing the flap and the slide have been omitted for the sake of clarity. The threading mechanism comprises two rails or guideways 37 and 38, which are made of a plastic and mounted on the chassis plate 34. On these rails two carriages 39 and 40 are located, which by electrically driven means, not shown, can be moved over the rails. This threading mechanism has already been described in the Patent Application No. 206,583, filed Nov. 13, 1980 (herewith incorporated by reference). On the carriage 39 a tape guide roller 41 is arranged and on the carriage 40 two tape guide members 42 and 43 are arranged as well as a pressure roller 44. In the initial position the carriages 39 and 40 are located at the opposite ends of the rails 37 and 38 respectively, i.e., the ends adjacent the cassette 23, the tape guide members 41 to 43 as well as the pressure roller 44 being in a position between the magnetic tape, which extends along the dash-dot line 36, and the housing of the magnetic-tape cassette 23. During the travel of the carriages 39 and 40 to their positions, shown in FIGS. 10 to 12, at the other ends of the rails 37 and 38 respectively the magnetic tape 21 is pulled out of the cassette and formed into a loop around the tape guide drum system. In the operating position shown in FIGS. 10 to 12 the magnetic tape 21 is in the correct position on the drum system comprising the rotary drum 13 and the stationary drum 19, and the magnetic tape also extends past a plurality of other elements, such as a magnetic erase head 45, as synchronization head 46 and an audio head 47. In their operating positions the tape guide members 41 and 42 are very accurately positioned in respect of height and direction, because the position and the direction of these members largely determines the accuracy of the lace-up of that part of the magnetic tape which is not yet situated on the drum unit. For positioning of the tape guide member 41 a pin-shaped end 50 of the tape guide member 41 is pressed into a stop plate 48 with a V-shaped recess 49. The other end of the tape guide member 14 is secured in a spherical portion 51 which seats in a corresponding conical recess, not shown, in a part 52 of a light-metal die-cast frame 53. At the top and bottom the tape guide member 42 is positioned by means of two V-shaped recesses 54, 55 in two plates 56 and 57 respectively, which are also mounted on the light-metal frame 53. For further information in respect of the positioning of the tape guide member 41 reference is made to the U.S. Pat No. 4,264,937 (herewith incorporated by reference). In the operating condition the tape guide members 41 and 42 are loaded by two pressure members 58 and 59, which press the tape guide members into the associated recesses.

The erase head 45, the synchronization head 46 and the audio head 47 are mounted on adjustable plates 60 and 61 respectively. The plate 60 is located at the top of two tape guide pins 62 and 63 and the plate 61 is located at the top of two similar tape guide pins 64 and 65.

The plates 60 and 61 also serve for mounting two pressure members 66 and 67 which take the form of leaf-springs, see FIGS. 10 to 17. These pressure members are adapted to cooperate with and to exert transverse pressure forces of a specific magnitude on the upper longitudinal edge 68 of the magnetic tape, which edge is remote from the tape-supporting edge 22, in order to press the magnetic tape against the tape-supporting edge 22 with a transverse force which is as constant as possible per unit of length over the entire part of the tape-supporting edge which begins at a tape support entry point B and ends at a tape support exit point E.

The pressure roller 44 cooperates with a capstan 69 constituted by the spindle of an electric capstan motor 70 which is suspended by tension springs 71 to 73 from the underside of the frame 53.

Figure 14:
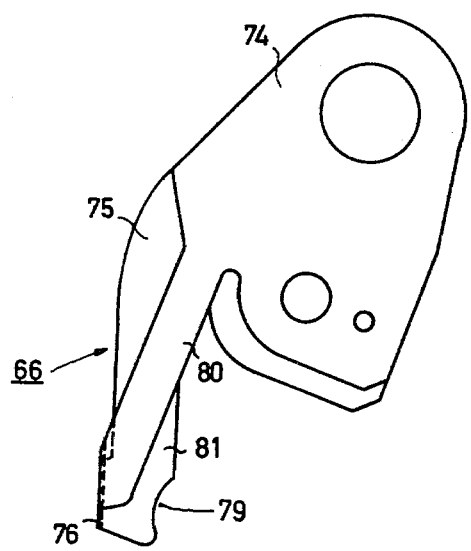
FIG. 14 is a plan view of a resilient pressure means for cooperation with a longitudinal edge of the magnetic tape.
Figure 15:
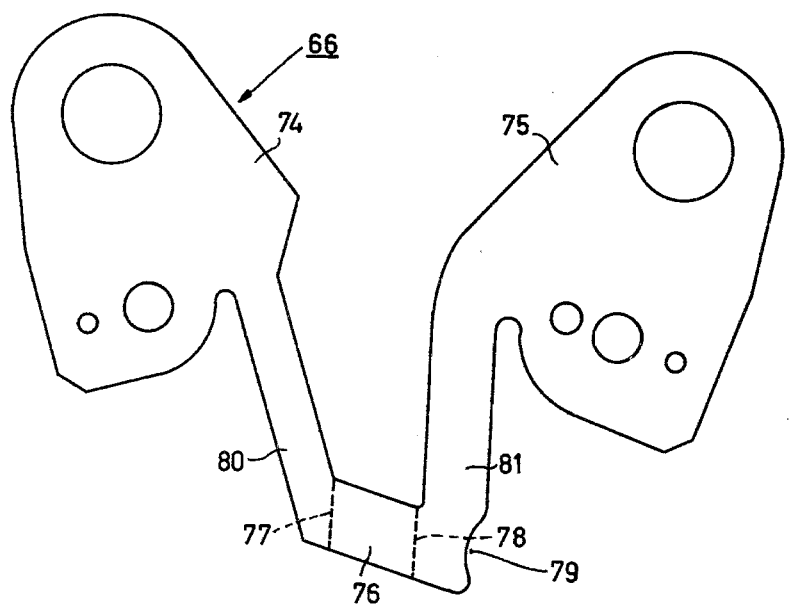
FIG. 15 is a development onto a plane of the pressure means of FIG. 14.

The pressure member 66, see FIGS. 14 and 15, comprises two portions 74 and 75, which are connected to each other by means of a connecting portion 76. These three portions together constitute one integral unit and are manufactured from a thin resilient sheet material. FIG. 15 shows the three portions developed onto a plane, before the unit is bent along the lines 77 and 78 so as to form the component shown in FIG. 14. The two portions 74 and 75 are provided with resilient arms 80 and 81, which are interconnected by the connecting portion 76. The arm 81 cooperates with the upper edge 68 of the magnetic tape 21, which edge is remote from the tape-supporting edge 22.

Figure 16:
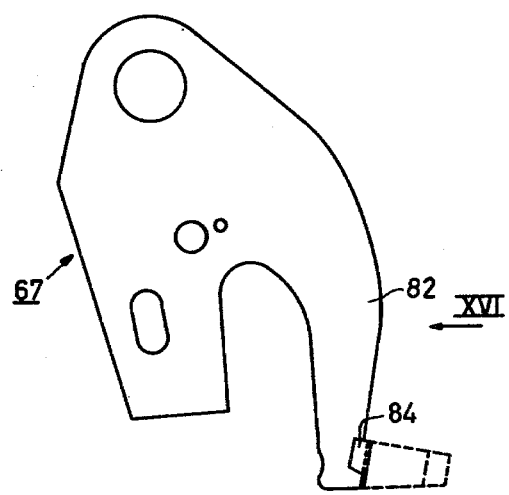
FIG. 16 is a plan view of a second resilient pressure means.
Figure 17:
FIG. 17 is a development onto a plane of the pressure means of FIG. 16.

The pressure member 67, see FIGS. 16 and 17, has a slightly different shape. It comprises an arm 82 at the end of which an upwardly bent part 83 is formed with a bent-over portion 84. This member is also manufactured from a resilient sheet material.

The arm 81 of the pressure member 66 is located on the underside and the arm 80 on the topside of the plate 60, which also carries the erase head 55. The two arms 80 and 81 function as leaf springs, which are coupled by means of the connecting portion 76. The pressure member 67 is mounted on the underside of the plate 61, which also carries the synchronization head 46 as well as the audio head 47, the bent-over portion 84 being located on the top side of the plate 61 and being cooperable therewith to form a stop for the arm 82, which functions as a leaf spring.

Viewed in a development of the stationary tape guide drum 19 onto a plane the tape-supporting edge 22 has a convex curvature on its side which faces the magnetic tape 21, with a peak approximately halfway between the tape-support entry point B and the tape-support exit point E. This will be described in more detail with reference to FIGS. 18 and 19, where it will be explained that the convex curvature of the tape-supporting edge 22, relative to an arc of a circle described by the tape-support entry point B, the tape-support exit point E and the peak of the curve, has a slightly smaller radius at the location of the peak and a slightly larger radius approximately halfway between the tape-support entry point and the peak and approximately halfway between the peak and the tape-support exit point. The pressure members 66 and 67 are located on opposite sides of the stationary drum 19, near the tape-support entry point B and the tape-support exit point E of the tape-supporting edge 22 at locations beyond these points with respect to the path of the tape between these points, in order to subject the magnetic tape 21 over the tape-supporting edge to a curvature in the plane of the magnetic tape in conformity with the convex curvature of the tape-supporting edge 22 and thus press and keep the magnetic tape pressed against the tape-supporting edge 22 with the desired transverse force, which should be as constant as possible per unit of length.

Instead of resilient and thus movable pressure members, it is alternatively possible to employ fixedly adjusted pressure members, which for example could be integral with the plates 60 and 61 or with the tape guide elements or pins 63 and 64. When such fixed pressure members are used accurate axial alignment of these members is necessary, in order to ensure that the correct force is exerted on the upper edge 68 of the magnetic tape which is remote from the tape-supporting edge 22. Thus, the use of resilient pressure members has the advantage that they demand a less accurate adjustment. By a suitable choice of the spring characteristic of the resilient pressure members it can be ensured that the pressure which is exerted always remains within a permissible range, even in the event of positional deviations of the longitudinal edges of the magnetic tape.

Yet another possibility of pressing the magnetic tape against the tape-supporting edge is the use of a pressure roller which is arranged slightly obliquely. This principle is known from, for example, U.S. Pat. No. 2,012,130 (herewith incorporated by reference). The pressure roller cooperates with the magnetic tape in its plane and is pressed gently against the tape. Owing to the oblique position of the pressure roller a frictional force is produced during transport of the magnetic tape, which force has a component which is directed towards the longitudinal edge of the magnetic tape which cooperates with the tape-supporting edge.

The resilient pressure members 66 and 67 cooperate with the upper edge 68 of the magnetic tape 21 at a location where the magnetic tape passes around the tape guide elements or pins 63 and 64 respectively, which two pins have cylindrical surfaces with a radius which is smaller than the transverse dimension of the magnetic tape 21. As a result of this, folding-over of the magnetic tape owing to the transverse pressure forces exerted by the pressure members 66 and 67, is less likely to occur.

Figure 1:
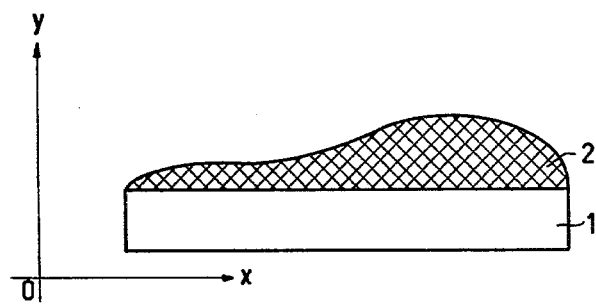
FIG. 1 is a schematic drawing of a beam to which a distributed load is applied.
Figure 2:
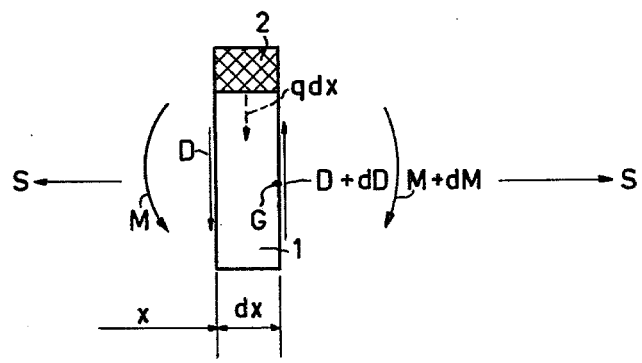
FIG. 2 is an enlarged view of an incremental portion of the beam showing forces and moments.
Figure 3:
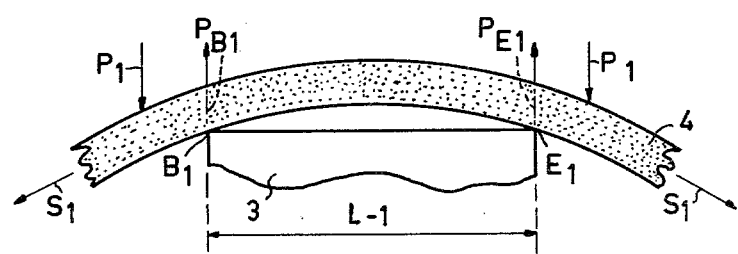
FIG. 3 is a schematic view of a tape guided along a straight tape-supporting edge, with exaggerated curvatures.
Figure 4:
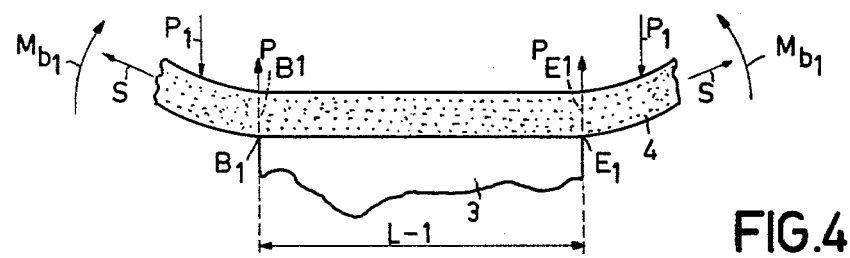
FIG. 4 is a schematic view similar to FIG. 3 but with external moments applied.
Figure 5:
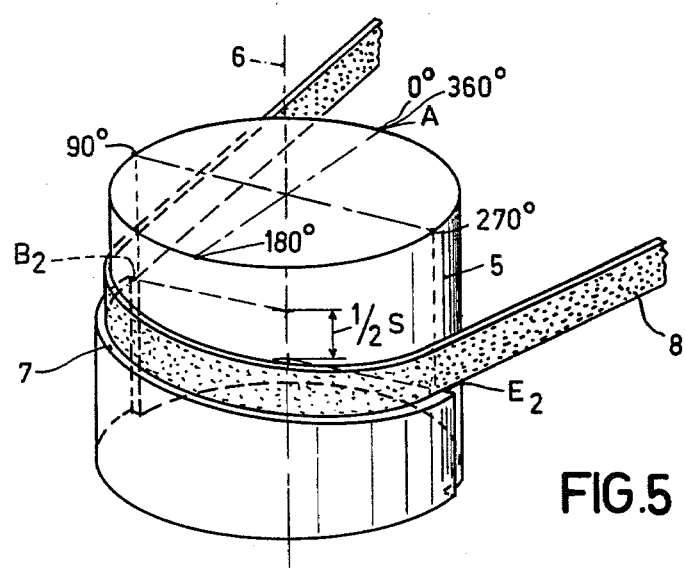
FIG. 5 is a schematic perspective view of a tape being guided along a helical path about a drum.
Figure 6:
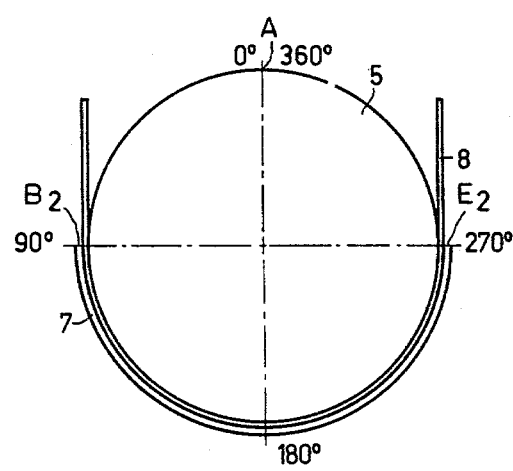
FIG. 6 is a plan view of the arrangement of FIG. 5.
Figure 7:
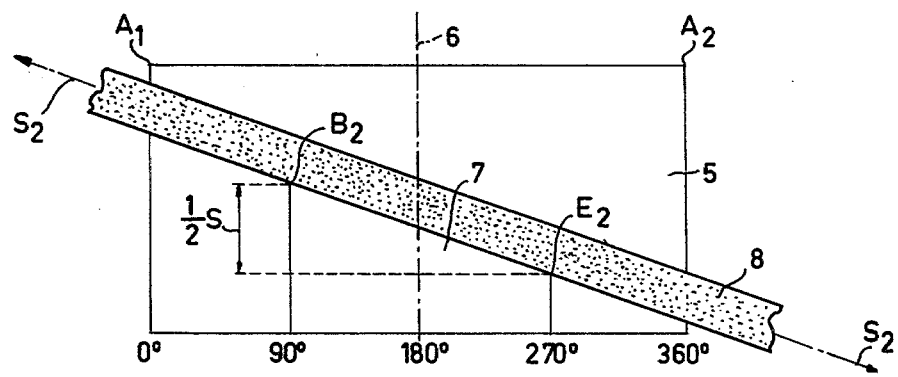
FIG. 7 is a developed schematic view of the arrangement of FIG. 5.
Figure 8:
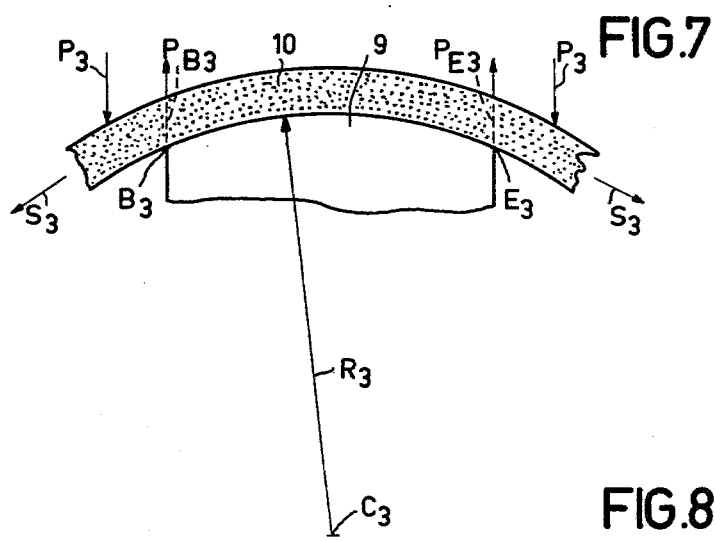
FIG. 8 is a schematic view with exaggerated curvature of a tape guided along a constant radius tape-supporting edge.
Figure 9:
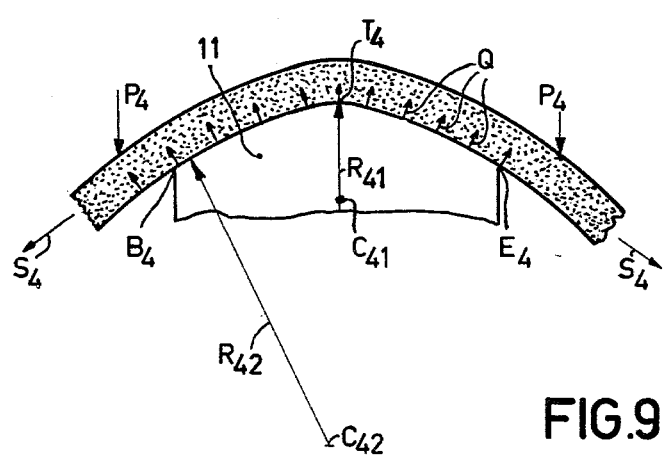
FIG. 9 is a schematic view of a tape guided along a tape-supporting edge in accordance with the invention.
Figure 18:
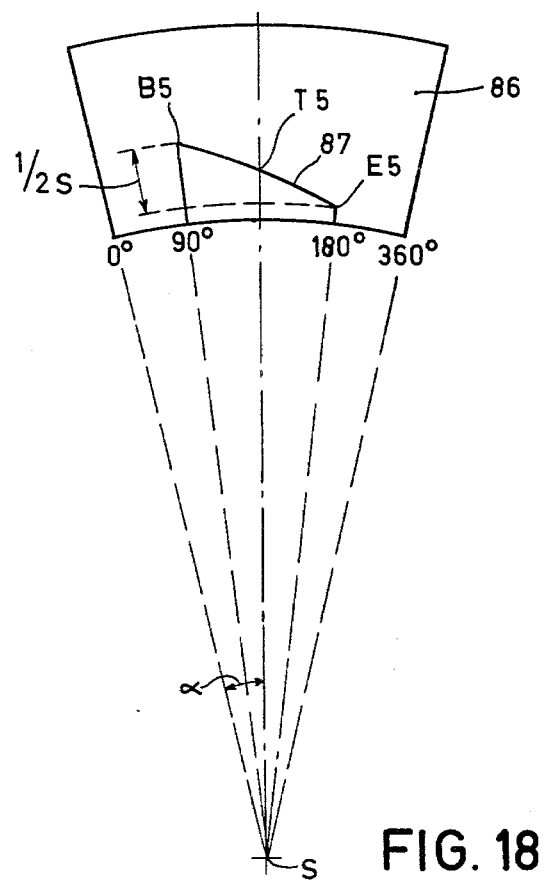
FIG. 18 is a diagram with exaggerated angles to illustrate an embodiment of the invention.

FIG. 18, in a similar manner to FIG. 17, very schematically represents a development of a tape guide drum system onto a plane. In this respect it is to be noted that in FIG. 18 no attention has been paid to correct scale nor to correct proportions; on the contrary, the situation has been represented in a highly exaggerated manner. FIG. 18 is therefore merely intended to illustrate the principle of an embodiment of the invention in the most convenient way. This embodiment has the feature that a circumferential surface 86 of a tape guide member may be a conical surface, whose apex S relative to the magnetic tape is situated beyond the side of the longitudinal edge of the magnetic tape which cooperates with a tape supporting edge 87. The tape-supporting edge 87 is an edge which extends around the conical surface 86 with a constant pitch s. As is clearly demonstrated by FIG. 18, the tape-supporting edge in such a case, when the circumferential surface is developed onto a plane, will be convexly curved between a tape-support entry point B5 and a tape-support exit point E5. This is in contradistinction to the case of FIG. 7, where the circumferential surface was situated on a cylinder and the tape-supporting edge followed a straight line. This fact is utilized in the tape guide member in the video recorder mechanism of FIGS. 10 to 13. The advantage is namely that in the case of a correct choice of the apex angle $\alpha$ of the cone, using relatively simple machining methods suitable for obtaining a supporting edge with a constant pitch, automatically a tape-supporting edge is obtained which already substantially has the curvature required in accordance with the invention, between the tape-support entry point and the tape-support exit point. In order to obtain an optimum curvature, for which computations may be applied, only a very small correction of the order of magnitude of a few microns is required to the constant-pitch form of the tape-surrounding edge which is thus automatically obtained.

Figure 19:
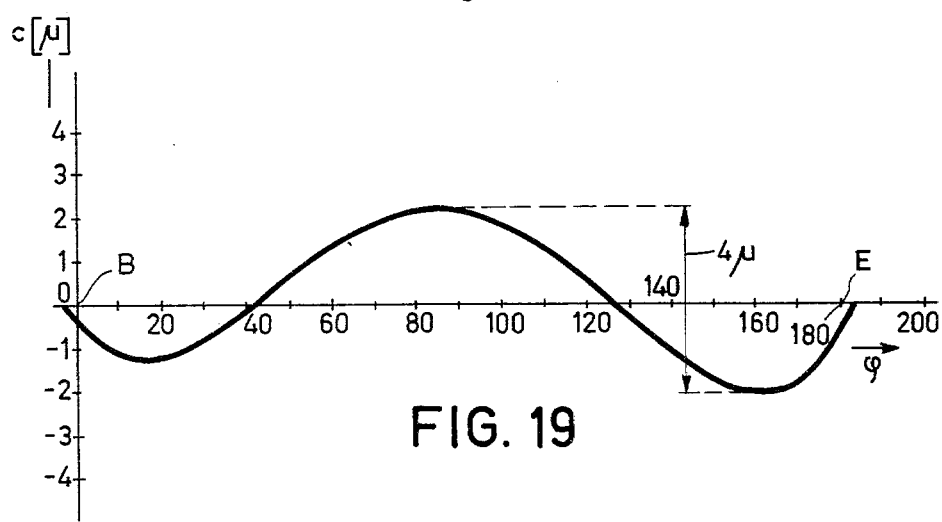
FIG. 19 is a graph of a correction c as a function of a wrapping angle $\phi$ to be applied to the curvature of a tape-supporting edge in a specific embodiment of the invention.

In the case of the helical-scan video recorder to which FIGS. 10 to 13 relate, the apex angle $\alpha$ of the cone, on which the circumferential surface of the head drum 13 as well as the portion 123 above the supporting edge 22 of the stationary drum 19 are situated, is 3.8 minutes of arc. FIG. 19 shows in graph form the correction which is to be applied to the constant-pitch form as a function of the location. On a vertical axis in this graph the required correction c in microns is indicated and on a horizontal axis the wrapping angle $\phi$ of the magnetic tape around the drum system in degrees of arc. The tape-support entry point is taken as the origin of the horizontal axis at $\phi=0$ and the tape-support exit point is situated at $\phi=180°$. As will be evident from the graph a correction to the constant-pitch form of the tape-supporting edge 22 is required which at the most is roughly 4 microns. This correction has been calculated for a magnetic tape with a height of 12.7 mm ($\frac{1}{2}$ inch), a thickness of approximately 20 microns, a tape tension in the longitudinal direction of the tape of approximately 0.5 Newtons and a transverse force exerted on the upper edge of the magnetic tape by the pressure members 66 and 67 of 0.048 Newtons and 0.040 Newtons, respectively.

The following table lists some numerical values by way of example. These values relate to the maximum height deviations $V_1$ of a magnetic tape, which are caused by height disturbances $V_o$ at a distance L from the tape-support entry point. The values are calculated values for the conventional guide system with a straight tape-supporting edge and for the guide systems with a curved tape supporting edge in accordance with the invention. In both cases it is assumed that the transverse pressure forces are 0.05 Newtons (5 gf).

| | | Max. height deviation on drum as a result of disturbance $V_o$ | |
|---|---|---|---|
| L | Disturbance $V_o$ situated at a distance L | Conventional guide system | Guide system in accordance with invention |
| 65 mm | 80 μm | 48 μm | 1 μm |
| 115 mm | 130 μm | 38 μm | 1 μm |

The motor housing 20, together with the circumferential surfaces 19 and 123, can be machined on a lathe. If a lathe is employed with an accurately journalled main spindle, it is possible to obtain the circumferential surface 123 by means of a diamond tool and at the same time to form the tape-supporting edge 22 with the required curvature using a copying cam mounted on the main spindle. The lathe as well as test equipment for checking the curvature of the tape-supporting edge thus formed should then be installed in a space whose temperature is controlled so as to be accurately constant. Alternatively, by a different manufacturing method a constant-pitch edge is formed first and subsequently the correction according to the graph of FIG. 19 is applied with the aid of an electronically controlled diamond tool which is mounted on a piezoelectric rod.

Figure 20:
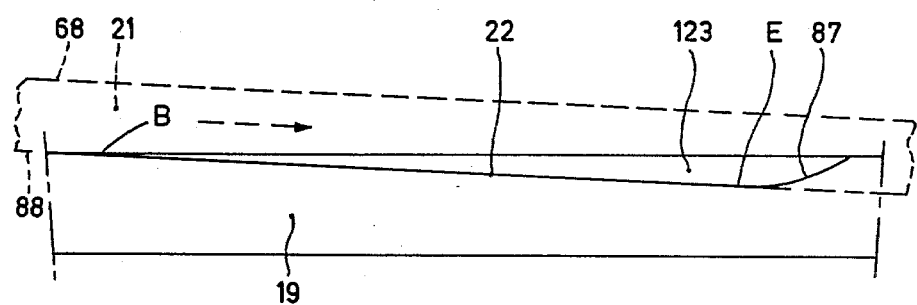
FIG. 20 is a development onto a plane of a stationary tape guide drum.

FIG. 20 shows an actual-size development of the circumferential surface of the stationary drum 19. The tape-supporting edge as well as the upper and lower rims of the stationary drum have represented by straight lines for the sake of simplicity. The stationary drum has a diameter of approximately 65 mm. After the tape-support entry point E the tape-supporting edge 22 changes into a lead-out edge 87. The configuration of this edge should be such that the magnetic tape 21 can leave the tape-supporting edge 22 without the lower edge 88 of the magnetic tape being impeded by the lead-out edge.

Figure 21:
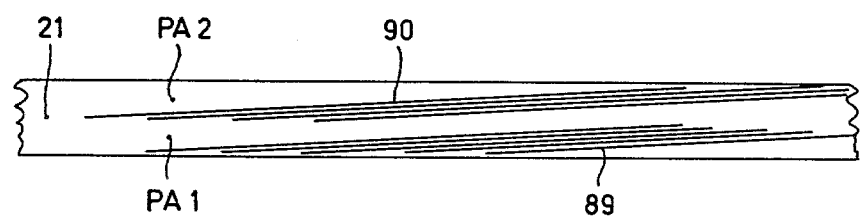
FIG. 21 represents the track configuration in two track patterns on a magnetic tape, when a stationary tape guide drum having a development in accordance with FIG. 20 is used.

From FIG. 20 may be derived the patterns, shown in FIG. 21, of the tracks 89 and 90 which can be written on the magnetic tape 21 with the aid of the video heads 16 and 17 in two track patterns PA1 and PA2 respectively. The pattern PA1 is written when the cassette 23 is in a first position and the pattern PA2 when the cassette is turned over into its second position.

What is claimed is:

1. An apparatus for recording and/or reading signals arranged in tracks on an elongated tape having substantially parallel longitudinal edges and having a specific resistance to bending in the plane of the tape, comprising:

a tape guide member defining a path between a tape-supporting entry point and a tape-supporting exit point, said member having a tape-supporting edge for supporting one of the longitudinal edges of such a tape accommodated in the apparatus and disposed along said path between said points, means for sustaining a tape tension of a given magnitude in the longitudinal direction on the tape disposed along said path, pressure members for exerting transverse pressure forces on the tape, to press the tape against the tape-supporting edge with a transverse force as constant as possible per unit of length between said points, and means for recording and/or reading signals arranged in tracks on said tape along said path, characterized in that, the tape-supporting edge has a curvature which is convex toward the tape having a peak substantially midway between the tape-support entry point and the tape-support exit point, said curvature, relative to an arc of a circle described by said entry and exit points and the peak of the curve, has a slightly smaller radius at the location of the peak and a slightly larger radius substantially midway between the peak and each of said entry and exit points respectively, and said pressure members are disposed at locations longitudinally spaced beyond said entry and exit points respectively, near said points, so as to subject the tape guided along said edge to a curvature in the plane of the tape in conformity with the convex curvature of the tape-supporting edge.

2. An apparatus as claimed in claim 1 wherein said tape guide member is a tape guide drum having an axis and a circumferential surface around which the tape is guided by said tape-supporting edge, said path being a substantially helical path.

3. An apparatus as claimed in claim 2, characterized in that said circumferential surface is a conical surface, the cone apex being located relative to the tape beyond the far side of the tape supporting edge which engages the tape, said tape supporting edge approximating an edge with a constant pitch.

4. An apparatus as claimed in claim 1, further comprising two curved tape guide elements disposed near said tape-support entry and exit points respectively and having radii of curvature which are small in proportion to the width of the tape, the tape being guided around said elements, the pressure members engaging the tape at the location where the tape is guided around the elements.

5. An apparatus for recording and/or reading signals arranged in tracks on an elongated magnetic tape having substantially parallel longitudinal edges and having a specific resistance to bending in the plane of the tape, comprising at least one magnetic head for recording and/or reading signals arranged in tracks on such a tape accommodated in the apparatus, a tape guide member for guiding the magnetic tape along a path past said at least one magnetic head, the tape guide member including a tape-supporting edge for supporting one of the longitudinal edges of the magnetic tape along said path between a tape-support entry point and a tape-support exit point, means for sustaining a tape tension of a given magnitude in the longitudinal direction on the tape disposed along said path, and pressure members for exerting transverse pressure forces on the magnetic tape, to press the tape against the tape-supporting edge with a transverse force as constant as possible per unit of length between said points, characterized in that the tape-supporting edge has a curvature which is convex toward the magnetic tape, having a peak substantially midway between the tape-support entry point and the tape-support exit point, said curvature, relative to an arc of a circle described by said entry and exit points and the peak of the curve, has a slightly smaller radius at the location of the peak and a slightly larger radius substantially midway between the peak and each of said entry and exit points respectively, and said pressure members are disposed at locations longitudinally spaced beyond said entry and exit points respectively, near said points, so as to subject the tape guided along said edge to a curvature in the plane of the tape in conformity with the convex curvature of the tape-supporting edge.

6. An apparatus as claimed in claim 5, adapted to record and/or read wide-band signals arranged along oblique adjacent tracks on the magnetic tape, characterized in that said tape guide member comprises a tape guide drum system having an axis of rotation, said system including a fixed guide drum having a circumferential surface around which the magnetic tape is guided by said tape-supporting edge in a substantially helical path, and a coaxially arranged drum section mounted for rotation about said axis, and said magnetic heads are accommodated on a magnetic head support rotatable about said axis, the heads being between said fixed and rotatable drum sections.

7. An apparatus as claimed in claim 6, characterized in that said circumferential surface is a conical surface, the cone apex being located relative to the magnetic tape beyond the far side of the tape supporting edge which engages the tape, said tape-supporting edge approximating an edge with a constant pitch.

8. An apparatus as claimed in claim 5, further comprising two curved magnetic tape guide elements disposed near said tape-support entry and exit points respectively and having radii of curvature which are small in proportion to the width of the magnetic tape, the magnetic tape being guided around said elements, the pressure members engaging the magnetic tape at the location where the magnetic tape is guided around the elements.

* * * * *